(12) United States Patent
Eick et al.

(10) Patent No.: US 9,213,119 B2
(45) Date of Patent: Dec. 15, 2015

(54) MARINE SEISMIC ACQUISITION (75) Inventors: Peter M. Eick, Houston, TX (US); Joel D. Brewer, Houston, TX (US); Stephen K. Chiu, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 708 days.

(21) Appl. No.: 12/604,243

(22) Filed: Oct. 22, 2009

(65) Prior Publication Data

US 2010/0103772 A1 Apr. 29, 2010

Related U.S. Application Data (60) Provisional application No. 61/109,403, filed on Oct. 29, 2008.

(51) Int. Cl.
*G01V 1/38* (2006.01)
*G01V 1/28* (2006.01)

(52) U.S. Cl.
CPC ................... *G01V 1/3808* (2013.01)

(58) Field of Classification Search
CPC ...... G01V 1/3808; G01V 1/375; G01V 1/366
USPC ........ 181/108, 113, 114, 121; 367/38, 40, 41, 367/43, 75, 189, 190, 23, 48; 702/17; 703/5
See application file for complete search history.

(56) References Cited

U.S. PATENT DOCUMENTS

| 4,686,654 A | 8/1987 | Savit | |
| 4,858,201 A * | 8/1989 | Goins et al. | 367/75 |
| 4,858,202 A * | 8/1989 | Fitch et al. | 367/75 |
| 5,050,129 A | 9/1991 | Schultz | |
| 5,166,905 A | 11/1992 | Carrie | |
| 5,410,517 A * | 4/1995 | Andersen | 367/75 |
| 5,550,786 A * | 8/1996 | Allen | 367/48 |
| 5,719,821 A | 2/1998 | Sallas et al. | |
| 5,721,710 A | 2/1998 | Sallas et al. | |
| 5,969,297 A * | 10/1999 | Ambs | 181/113 |
| 6,480,440 B2 | 11/2002 | Douma et al. | |
| 6,519,533 B1 | 2/2003 | Jeffryes | |
| 6,847,896 B1 | 1/2005 | Orban et al. | |
| 7,050,356 B2 | 5/2006 | Jeffryes | |
| 7,864,630 B2 | 1/2011 | Chiu et al. | |
| 7,869,304 B2 | 1/2011 | Olson et al. | |
| 2004/0136266 A1 | 7/2004 | Howlid et al. | |
| 2005/0128874 A1 | 6/2005 | Herkenhoff et al. | |
| 2006/0164916 A1 | 7/2006 | Krohn et al. | |
| 2008/0011540 A1 | 1/2008 | Moldoveanu et al. | |
| 2010/0002536 A1 | 1/2010 | Brewer et al. | |

FOREIGN PATENT DOCUMENTS

WO 9819181 5/1998

OTHER PUBLICATIONS

U.S. Appl. No. 61/109,279, filed Oct. 29, 2008, Eick et al.
U.S. Appl. No. 61/109,329, filed Oct. 29, 2008, Chiu et al.
U.S. Appl. No. 61/109,403, filed Oct. 29, 2008, Eick et al.
U.S. Appl. No. 61/112,810, filed Nov. 10, 2008, Brewer et al.

(Continued)

*Primary Examiner* — Daniel L Murphy
(74) *Attorney, Agent, or Firm* — ConocoPhillips Company (57) ABSTRACT A method of conducting multiple source, multiple signal seismic surveys in a marine environment are provided.

23 Claims, 5 Drawing Sheets

(56) References Cited

OTHER PUBLICATIONS

U.S. Appl. No. 61/112,875, filed Nov. 10, 2008, Eick et al.
U.S. Appl. No. 61/121,976, filed Dec. 12, 2008, Cramer et al.
Bordley, "Linear predictive coding of marine seismic data" IEEE Transactions on Acoustics, Speech and Signal Processing, 31:828-835.
Chiu, et al. High Fidelity Vibratory Seismic (HFVS): Optimal Phase Encoding Selection: SEG/Houston 2005 Annual Meeting ACQ 2.2.

* cited by examiner

$$[S_1 \ S_2 \ S_3 \ S_4 ; S_1 \ S_2 \ S_3 \ S_4 ; S_1 \ S_2 \ S_3 \ S_4 ; S_1 \ S_2 \ S_3 \ S_4] \times [h_1 \ h_2 \ h_3 \ h_4] = [R_1 \ R_3 \ R_5 \ R_7]$$

SWEEP 1, SWEEP 2, SWEEP 3, SWEEP 4 — 44 — 46 — 36

FIG. 6

$$[S_1 \ S_2 \ S_3 \ S_4 ; S_1 \ S_2 \ S_3 \ S_4 ; S_1 \ S_2 \ S_3 \ S_4 ; S_1 \ S_2 \ S_3 \ S_4] \times [h_1 \ h_2 \ h_3 \ h_4] = [R_2 \ R_4 \ R_6 \ R_8]$$

SWEEP 1, SWEEP 2, SWEEP 3, SWEEP 4 — 44 — 46 — 38

MARINE SEISMIC ACQUISITION

PRIOR RELATED APPLICATIONS

This application is a non-provisional application which claims benefit under 35 USC §119(e) to U.S. Provisional Application Ser. No. 61/109,403 filed Oct. 29, 2008, entitled "MARINE SEISMIC ACQUISITION," which is incorporated herein in its entirety.

FIELD OF THE DISCLOSURE

The present invention relates generally to processes for acquiring and/or processing seismic data in marine environments. One aspect of the invention concerns a method of generating more accurate marine seismic data by adapting multiple source seismic acquisition techniques, including ZENSEIS™ and High Fidelity Vibratory Seismic (HFVS), for use in marine environments.

BACKGROUND OF THE DISCLOSURE

Multiple source vibrator technology has been used in land-based seismic surveys for years, and its advantages are well documented. Conventional land-based seismic assays employ multiple, simultaneously energized seismic sources (e.g., trucks with vibrating baseplates) to impart vibratory energy into the ground. The imparted vibratory energy travels through the ground, is reflected and/or refracted by various discontinuities in the ground, and the reflected vibratory energy is detected by multiple seismic receivers (e.g., geophones) that are located on the ground at a distance from the seismic sources. The reflected vibratory energy recorded by the receivers is a composite reading representing the reflected energy originating from all the seismic sources. An important step in conventional multiple source vibrator technology is "source separation" of the composite data into discrete source specific data.

In order to allow for source separation, conventional multiple source vibrator technology requires multiple sweeps to be performed while the seismic sources maintain a fixed location. According to conventional multiple source vibrator, the number of sweeps performed at a fixed source location must be equal to or greater than the number of sources sought to be separated. For example, if four seismic sources are being used in a conventional multiple source vibrator acquisition scheme, at least four sweeps must be carried out for each source set-up. In addition, conventional multiple source vibrator technology requires uniquely encoded (e.g., phase, frequency, and/or amplitude encoded) vibratory energy for each sweep, so that source separation of the resulting composite data can be performed.

Marine data are traditionally collected using multiple airgun sources with multiple streamers of receivers. Multiple sources mean flip-flop shooting, decreased fold, aliased multiples and other undesirable acquisition patterns. Multiple streamers mean increased minimum-offset for some bins and increased noise from the diverging side wings for other bins. Single-source single-streamer acquisitions offer much better sampling, but with such low productivity (in terms of square kilometers acquired per day) that 3D acquisition costs become prohibitive.

Although multiple source vibrator techniques have many known advantages, multiple source vibrator techniques have not been applied to marine seismic surveys for a variety of reasons. For example, the most commonly used seismic sources for marine seismic acquisition (e.g., air guns) are not capable of generating the uniquely encoded vibratory energy required for later source separation. Perhaps a larger obstacle to the implementation of multiple source vibrators in marine environments is the requirement that multiple sweeps be performed with the sources located in a fixed position. In marine environments, it is nearly impossible to perform multiple seismic sweeps with multiple seismic sources remaining in a fixed position, particularly in light of the ocean currents and winds common to most marine environments. Finally, the marine environment has unique reflectance properties that can interfere with the encoded vibratory signal.

What is required are methods of obtaining high fidelity seismic surveys with continuous and/or multiple sources simultaneously in a marine environment using uniquely encoded vibratory signals.

BRIEF DESCRIPTION OF THE DISCLOSURE

Various embodiments of the present invention provide methods for employing certain aspects of multiple high-fidelity seismic techniques in a marine environment. In accordance with one embodiment of the present invention, marine seismic data is acquired by performing a series of periodic marine seismic sweeps, each at different locations. Each sweep involves simultaneously exciting a plurality of seismic sources and then receiving composite reflected/refracted seismic signals with one or more marine seismic receivers. The acquired marine seismic data is then reorganized based on common source-receiver centerpoints. The resulting reorganized data is then subjected to a conventional source separation technique.

In another embodiment, multiple uniquely encoded seismic surveys are run simultaneously or during the same time period without being synchronized. This allows more than one seismic source to transmit continuously independent of other sources being used at the same or similar times. During data processing and analysis, the plurality of source-receiver combinations can be separated into geographically discrete seismic data either in real time on board the ship or in post-acquisition processing where a variety of parameters may be analyzed. Thus the benefit of wider spread and denser crossline sampling can be obtained using multiple sources and receivers at the same time without degrading sampling in the midpoint and receiver domain because each source behaves as an independent single source with independent encoding that is separated using source separation techniques. The quality of the data collected is improved, the cost of the survey is decreased, and the quality of the final image is dramatically improved using these techniques.

Energy sources or "source" includes ZENSEIS™, vibroseis, seismic vibrators, airguns, plasma shots, dynamite, and other sources known to one of ordinary skill in the art. Marine seismic vibrators include boats or ships, trailers, submarine sources, subterranean sources, or other sources that can transfer unique vibratory signals to the earth or water. In one embodiment a reaction mass is vibrated at varying frequencies against the baseplate to produce vibratory motion (transmit vibration energy) which travels downward through any intervening water into the earth via the base plate. A survey may be designed that uses multiple energy sources, each being activated simultaneously so that the recording instruments capture a composite signal with contributions. The composite signal forms a record that may be either intentionally composite or separable through data inversion. A variety of programs are available to generate differing source patterns controlled in space, time, and frequency.

In vibroseis the seismic energy source is distributed over a period of time. This distribution of energy over time creates a distinct signal, such as a sweep, in which the signal changes systematically from low frequency at the beginning to high frequency at the end of the source. Dependent upon the desired signal, number of vibroseis being conducted simultaneously, and transmission properties of the ground, different seismic sweeps may be developed. Computer processing of the seismic signals uses the distinct characteristics of the sweep to "collapse" the energy into short duration wavelets. ZENSEIS™ sources include vibroseis, seismic vibrator, and combinations thereof. Other multiple source seismic surveys include high fidelity vibratory seismic (HFVS), cascaded HFVS, combined HFVS, slipsweep, and the like.

"Simultaneous" sweeps are conducted by two or more seismic sources during overlapping periods of time. In contrast, synchronous sweeps are conducted by two or more seismic sources started and stopped at the same time. Using a starting pulse signal, computer control, or other coordinated methods, synchronized vibrators on a seismic survey may be started within milliseconds to generate a synchronous seismic signal. During synchronous seismic surveys the source vibrator frequency, phase, amplitude, and the like, may be synchronized to reduce interference, enhance signal, or otherwise enhance or modify the recorded data. Using a "simultaneous" sweep the source signals may have a "lag" either by design or unintentionally. In one embodiment, source signals are intentionally designed with a lag from 1 ms to 10 seconds wherein the lag allows independent signal encoding. In another embodiment, seismic sources are given one or more positions and time window but are operated independently. When the seismic sources are operated independently an arbitrary lag is created due to the asynchronous (or random) operation of the sources.

Receivers include geophones, hydrophones, accelerometers, electrodynamic receivers, and the like. Receivers may receive one or more than one type of data including vibrational data, acceleration data, magnetic data, and gravitational data. Vibrational data may be measured between about 1 Hz to 2 KHz, including data from 6 to 80 Hz, about 20 to 40 Hz, or simply all data less than 160 Hz, and combinations thereof. Receivers may include a recorder or transmit data to a remote recorder. An autonomous recorder as described in copending application Ser. No. 61/112,875, incorporated by reference, includes receiver/recorder combinations that automatically record data from the receiver including systems that record data at the receiver and those that record data at a remote location. In a preferred embodiment, data is stored in a temporary drive at the receiver until it is transferred either physically or wirelessly to a central recorder for data analysis.

Copending application Ser. No. 12/167,683 describes methods of using controlled streamer flaring to increase wider spread with a given set of receivers. Marine seismic data is acquired using steerable seismic streamers that arc towed through a body of water in a flared configuration. Use of controlled streamer flaring reduces or eliminates the need for in-filling, without requiring additional equipment or more acquisition passes than conventional marine seismic surveying techniques.

Methods of acquiring and processing marine seismic data are described where multiple seismic receivers are moved through a body of water; simultaneously a series of periodic seismic sweeps are performed by simultaneously energizing at least two seismic sources and acquiring source seismic data and reflected seismic data; reorganizing the seismic data based on common source-receiver centerpoints from different seismic sweeps to generate reorganized seismic data; and source separating the reorganized seismic data.

Methods of processing seismic data including encoded source data for multiple sweeps with simultaneous excitation of multiple seismic sources at substantially different location for each sweep, acquiring reflected seismic data by multiple seismic receivers for each of the multiple sweeps; reorganizing the reflected seismic data based on common source-receiver centerpoints from different sweeps, to generate reorganized reflected seismic data; then source separating the reorganized reflected seismic data.

Seismic sweeps include exciting at least two seismic sources for a period of 1 to 5 seconds, 2 to 30 seconds, or from 100 milliseconds to 10 seconds. Seismic sweeps may be less than approximately 100, 50, 25, 20, 15, 10, 9, 8, 7, 6, 5, 4, 3, 2, or 1 seconds. Sweeps may also be less than approximately 1000, 750, 500, 350, 250, 150, or 100 milliseconds. Sweeps may be independent, pulsed, gradient, or variable dependent upon the vibratory energy required.

Vibratory energy emitted by the seismic sources during each sweep can be encoded for source separation. Seismic sources are capable of emitting vibratory energy of controlled phase, frequency, and amplitude. In one embodiment, vibratory energy emitted by said seismic sources during each sweep can be phase encoded. Seismic sources include emission of vibratory energy from 1-150 Hz, 6-120 Hz, 1-60 Hz, 50-150 Hz, 1-80 Hz, 80-160 Hz and the like.

The power output of each seismic source can be 1-500, 15-250, or 20-100 bar • meters • sec. In one embodiment the cumulative power output of all seismic sources during each seismic sweep is less than 100, 25, or 10 bar • meters • sec.

Reorganized seismic data may include grouping reflected seismic data from different sweeps and different receivers based on the common source-receiver centerpoints. Separating reorganized source data can be performed using a matrix inversion on the source signature data and the reorganized reflected seismic data. In one example, encoded source data from each of seismic sweep uses reflectivity values determined by solving the equation:

$$\begin{bmatrix} S_{11}S_{12} & \cdots & S_{1N} \\ S_{21}S_{22} & \cdots & S_{2N} \\ & \cdots & \\ S_{M1}S_{M2} & \cdots & S_{MN} \end{bmatrix} \begin{bmatrix} h_1 \\ h_2 \\ \cdots \\ h_N \end{bmatrix} = \begin{bmatrix} R_1 \\ R_2 \\ \cdots \\ R_M \end{bmatrix}$$

wherein each S represents encoded source data for a particular sweep and a particular seismic source, wherein each R represents reorganized reflected data for a particular sweep, wherein M represents the number of sweeps being processed, wherein N represents the number of seismic sources being processed, wherein h represents said seismic reflectivity values.

DETAILED DESCRIPTION OF EMBODIMENTS OF THE INVENTION

Figure 1:
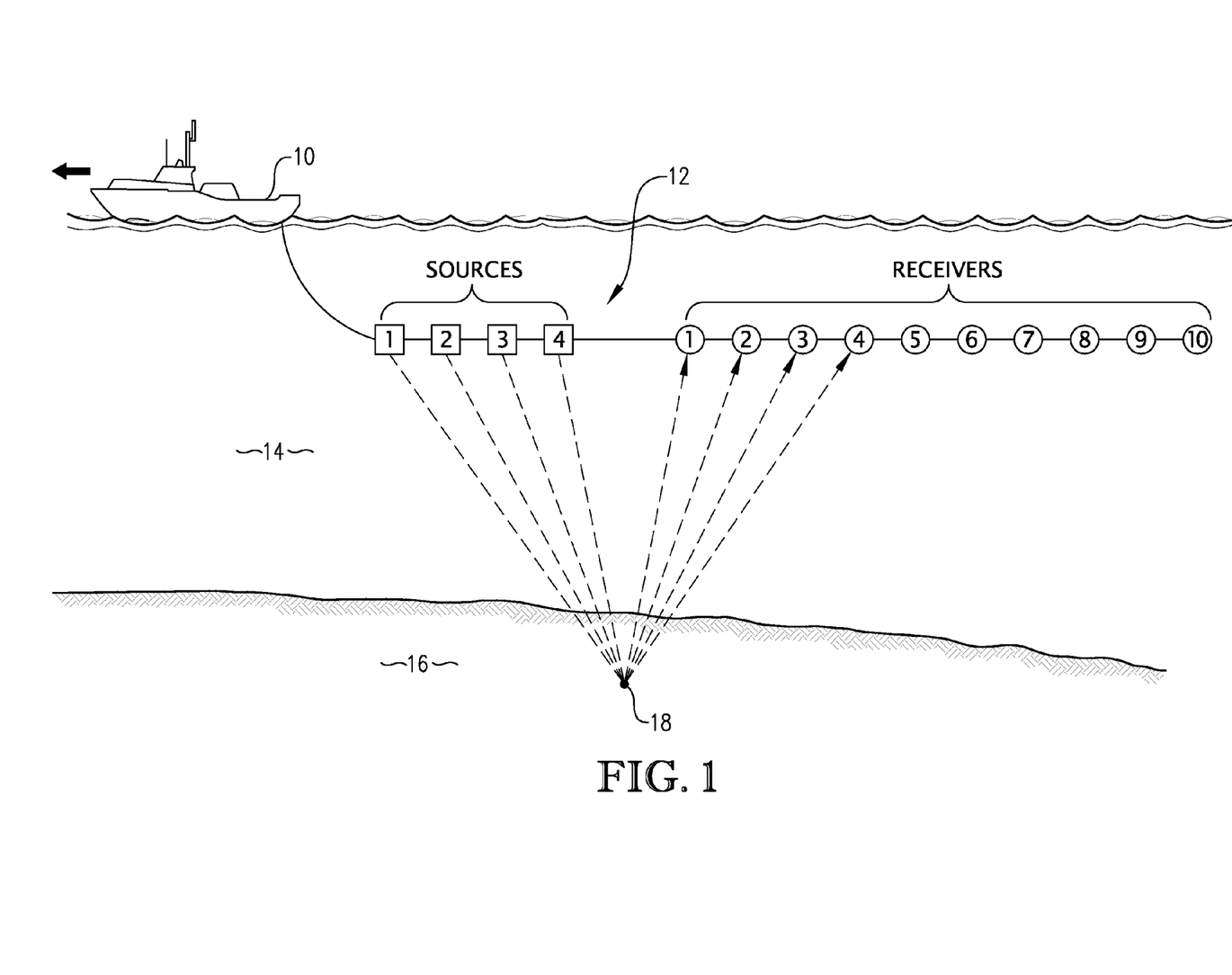
FIG. 1: Marine seismic survey design.

One or more ships towing a plurality of seismic sources and seismic receivers are shown in FIG. 1. The marine vessel 10 tows one or more streamers 12 with one or more seismic sources ((□)) and/or one or more seismic receivers ((○)) including hydrophones, accelerometers, and the like through a body of water 14 to acquire seismic data for a subterranean geological formation 18. As the marine vessel 10 tows the seismic sources and receivers through the water 14, the seismic sources are simultaneously excited to thereby generated wave energy that propagates down through the water 14 and into the geological formation 16. The wave energy is then reflected and/or refracted by interfaces between strata of the geological formation 16. The resulting reflected/refracted seismic energy then passes upwardly through the water 14 and is detected by the seismic receivers. As depicted in FIG. 1, for a given sweep, all of the seismic sources share a common centerpoint 18 with a corresponding group of the seismic receivers.

The seismic sources employed in the present invention can be any marine seismic sources capable of imparting enough acoustic or vibratory energy to yield reflected seismic data that carries useful information about the characteristics of the subsea formation being investigated. Generally, seismic sources suitable for use in the present invention can exhibit a power output in the range of 1 to 500 bar·meters, in the range of 15 to 250 bar·meters, or in the range of 30 to 100 bar·meters. Although air guns are the most common marine seismic sources in use today, certain advantages of the present invention can be realized if the seismic sources are not air guns. In one embodiment, the seismic sources are capable of emitting vibratory energy that is encoded to facilitate later source separation. Various source encoding schemes suitable for use with the present invention include, for example, phase encoding, frequency encoding, and/or amplitude encoding. A particularly useful encoding method is phase encoding. The seismic sources employed in the present invention can also be capable of simultaneously emitting vibratory energy of different frequency ranges so that during a single sweep, different seismic sources emit vibratory energy across different frequency ranges. Examples of commercially available marine seismic sources that may be suitable for use in the present invention include, for example, the T-2500™ Marine Vibrator (Industrial Vehicles International, Inc. of Tulsa, Okla.) and the PGS Electrical Marine Vibratory (PGS Geotechnical of Houston, Tex.). The seismic receivers employed in the present invention can be any seismic receivers capable of detecting reflected/refracted seismic energy traveling through a body of water. One example of a commercially available marine seismic receiver that may be suitable for use in the present invention is an AQ-2000™ Marine Seismic Receiver (Teledyne Benthos of North Falmouth, Mass.).

Figure 2:
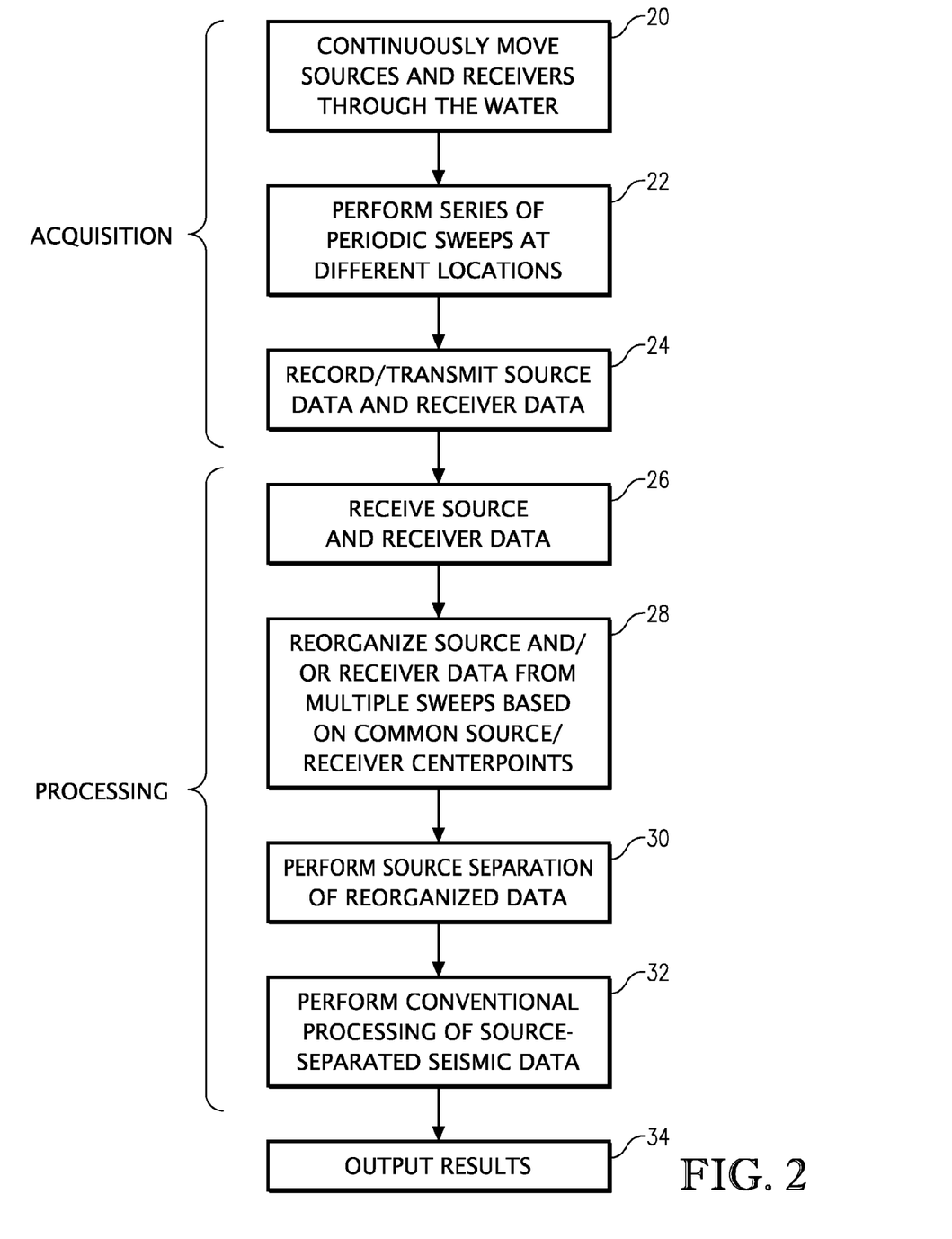
FIG. 2: Diagram depicting the major steps involved in a seismic acquisition and processing method carried out in accordance with one embodiment of the present invention.

Turning now to FIG. 2, the major steps involved in carrying out the process of the present invention will now be described in detail. As show in FIG. 2, the present invention can involve both the acquisition and processing of seismic data. The main acquisition steps are depicted in FIG. 2 as steps 20, 22, and 24, while the main processing steps are depicted in FIG. 2 as steps 26, 28, 30, 32, and 34. Each of these acquisition and processing steps is described in detail below.

Figure 3:
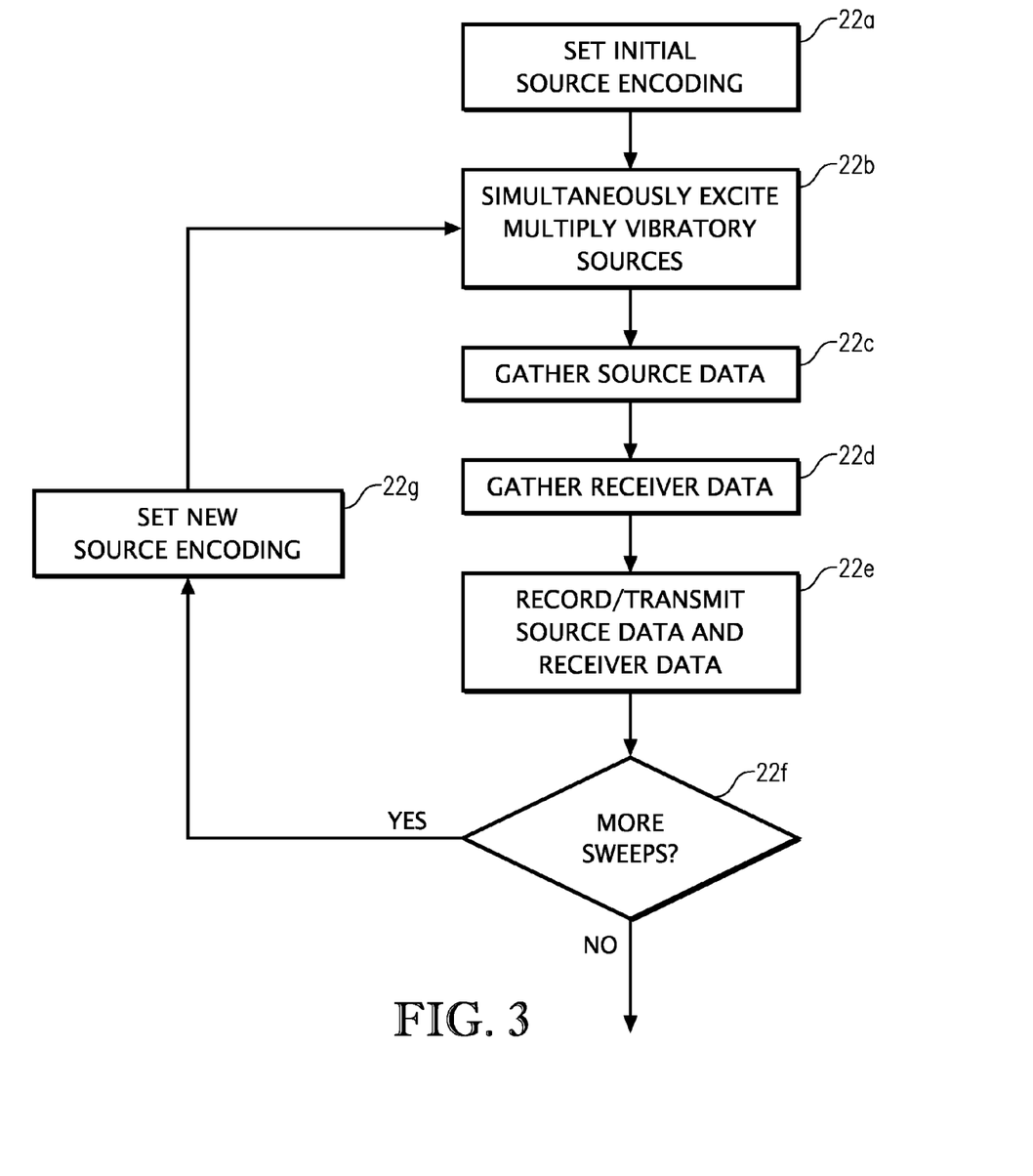
FIG. 3: Diagram depicting individual steps involved the seismic sweeps.

In step 20 of FIG. 2, a plurality of marine seismic sources and a plurality of seismic receivers are continuously moved through a body of water. In step 22, while the seismic sources and receivers are being moved through the water, a series of periodic seismic sweeps are performed at different locations. As shown in FIG. 3, the sweeps of step 22 can be carried out by employing substeps 22a-f. Referring now to FIG. 3, in step 22a, an initial encoding (e.g., phase encoding) of the seismic sources is set. In step 22b, an initial sweep is commenced by simultaneously exciting a plurality of the marine seismic sources to thereby impart encoded wave energy into the water. In step 22c, source data for the initial sweep is gathered. This source data can include, for example, the pilot signal sent to the seismic sources and/or actual measurements of the wave energy imparted by the seismic sources. In step 22d, receiver data for the initial sweep is gathered by a plurality of the marine seismic receivers. This receiver data represents the reflected/refracted seismic waves recorded by the marine seismic receivers for the initial sweep. In step 22e, the gathered source and receiver data for the initial sweep is transmitted for real-time processing and/or is recorded for later processing. In step 22f, a determination is made as to whether another sweep is desired. If another sweep is desired, step 22g sets a new source encoding for a subsequent sweep. Thereafter, steps 22b through 22f are repeated for the subsequent sweep. When all desired sweeps have been recorded and/or transmitted, the series of seismic sweeps is complete. Referring back to FIG. 2, once the series of seismic sweeps of step 22 is complete, step 24 is carried out to transmit the source and receiver data for real-time processing and/or record the source and receiver data for later processing.

As depicted in FIG. 2, the seismic data processing steps can begin with step 26, wherein source and receiver data from the marine seismic acquisition steps is received for processing. As mentioned above, the source and receiver data can be received in real-time from the seismic acquisition or can be previously-recorded acquisition data. In step 28, the source and/or receiver data from multiple seismic sweeps are reorganized based on common source receiver centerpoints. This reorganization step can be accomplished using a variety of techniques. Generally, this reorganization step groups the data from multiple seismic sweeps together based on common source/receiver centerpoints. Generally, the number of sweeps grouped together to the data reorganization step must be at least as great as the number of seismic sources used for the grouped sweeps. This allows for later source separation of the reorganized/re-grouped data. Accordingly, in one embodiment of the present invention, the reorganization technique of step 28 yields reorganized seismic data that can be subjected to source separation by conventional techniques.

Figure 4:
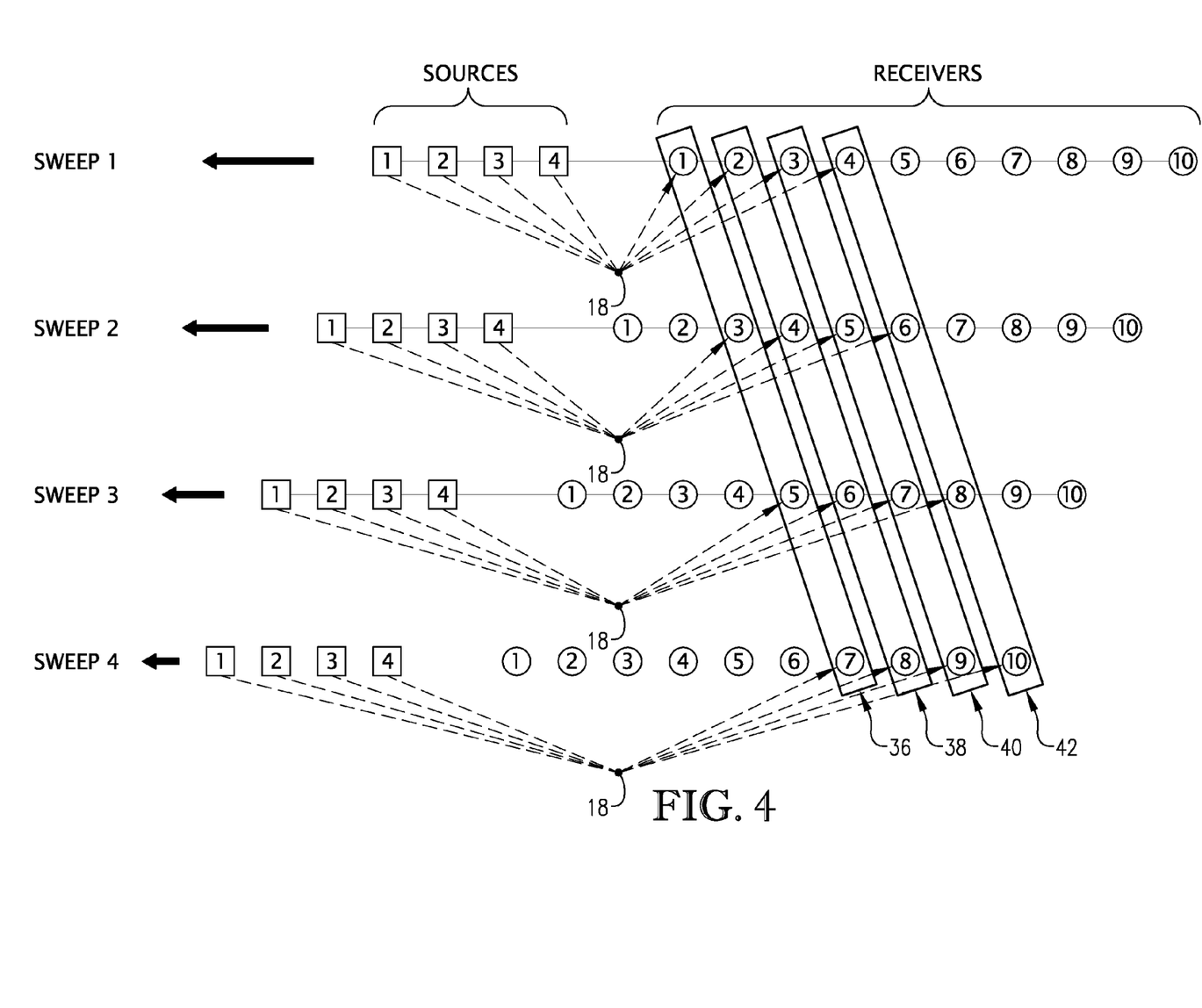
FIG. 4: Source and receiver location during successive seismic sweeps. Common centerpoint (18) can be used to bin source-receiver data from different sweeps.

FIG. 4 visually depicts one data reorganization technique suitable for use with the present invention. FIG. 4 shows the positions of the seismic sources (□) and seismic receivers (○) over a series of four seismic sweeps, with Sweep 1 being the first sweep and Sweeps 2-4 following in sequence. The arrows (←) in FIG. 4 indicate the direction of travel of the sources and receivers as they are towed through the water and the sweeps are performed. FIG. 4 shows that a common centerpoint 18 exists for each of the four sources and each of the four sweeps. In an analogous land-based multiple source vibrator, the four sweeps would be carried out while the sources and receivers are stationary. Thus, in land-based multiple source vibrator, each pair of sources and receivers would have a common centerpoint for each sweep, and no data reorganization would be required for conventional source separation. However, in marine seismic acquisition, since the sources and receivers are in different locations for each sweep, the centerpoints for a fixed pair or sources and receivers is at a different location for each sweep. However, the inventors have discovered that by reorganizing marine seismic data based on common centerpoints of different seismic sweeps, the movement of the sources and receivers can be compensated for, and accurate source separation of marine seismic data can be performed by conventional source separation techniques.

As depicted in FIG. 4, in Sweep 1, source/receiver pairs 1/4, 2/3, 3/2, and 4/1 all share a common centerpoint 18. In Sweep 2, a common centerpoint 18 exist for each of the sources at the same location as the common centerpoint 18 of Sweep 1. However, for Sweep 2, the source/receiver pairs associated with the common centerpoint 18 are not the same as the source/receiver pairs associated with the common centerpoint 18 of Sweep 1. Rather, in Sweep 2, source/receiver pairs 1/6, 2/5, 3/4, and 4/3 share the same common centerpoint 18 as the common centerpoint 18 of Sweep 1. Similarly, in Sweep 3, source/receiver pairs 1/8, 2/7, 3/6, and 4/5 share the common centerpoint 18, while in Sweep 4, source/receiver pairs 1/10, 2/9, 3/8, and 4/7 share the common centerpoint 18. Thus, in the embodiment depicted in FIG. 4, common centerpoints at 18 are "common" in two senses: (1) they are common to all the sources and (2) they share a common physical location for each of the sweeps.

The data reorganization technique depicted in FIG. 4 reorganizes the seismic receiver data into data groups 36, 38, 40, and 42 based on the common centerpoints 18 of Sweeps 1-4. The first data group 36 represents the receiver data from Sweeps 1-4 that share the common centerpoints 18 with Source 4. More specifically, in Sweep 1, source 4 shares the common centerpoint 18 with receiver 1; in Sweep 2, source 4 shares the common centerpoint 18 with receiver 3; in Sweep 3, source 4 shares the common centerpoint 18 with receiver 5; and in Sweep 4, source 4 shares the common centerpoint 18 with receiver 7. The second data group 38 represents the receiver data from Sweeps 1-4 that share the common centerpoints 18 with Source 3. More specifically, in Sweep 1, source 3 shares the common centerpoint 18 with receiver 2; in Sweep 2, source 3 shares the common centerpoint 18 with receiver 4; in Sweep 3, source 3 shares the common centerpoint 18 with receiver 6; and in Sweep 4, source 3 shares the common centerpoint 18 with receiver 8. Similarly, the third data group 40 represents the receiver data from Sweeps 1-4 that share the common centerpoints 18 with source 2; and the fourth data group 42 represents the receiver data from Sweeps 1-4 that share the common centerpoints 18 with source 1.

Figure 5:
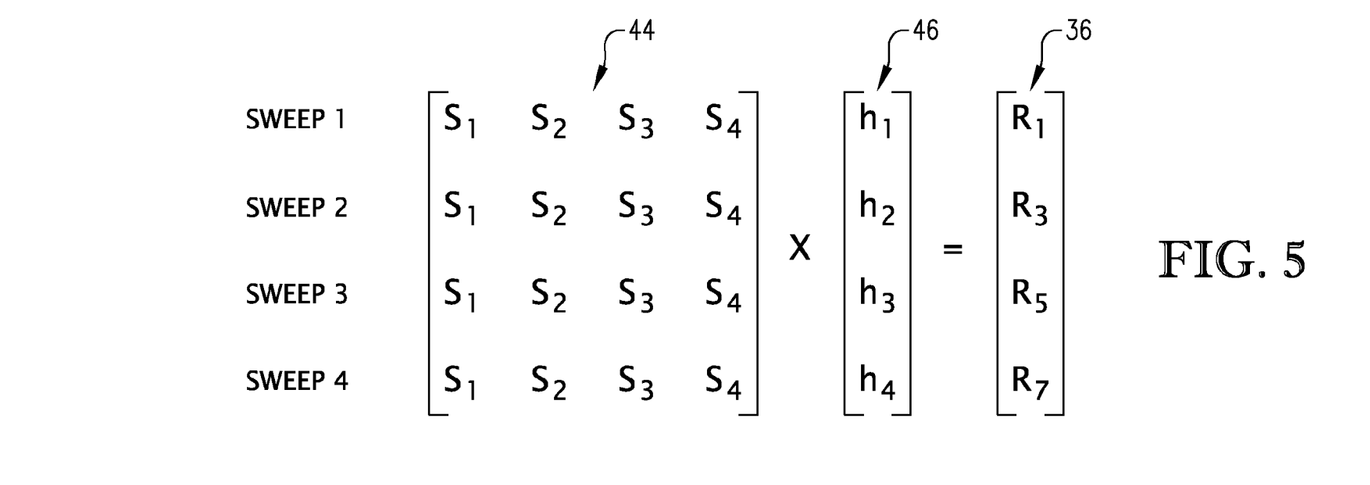
FIG. 5: Analysis of seismic data. Data are binned by common centerpoint for each of the data from one or more source-receiver combinations, where the equation is used to determine a first set of reflectivity values.
Figure 6:
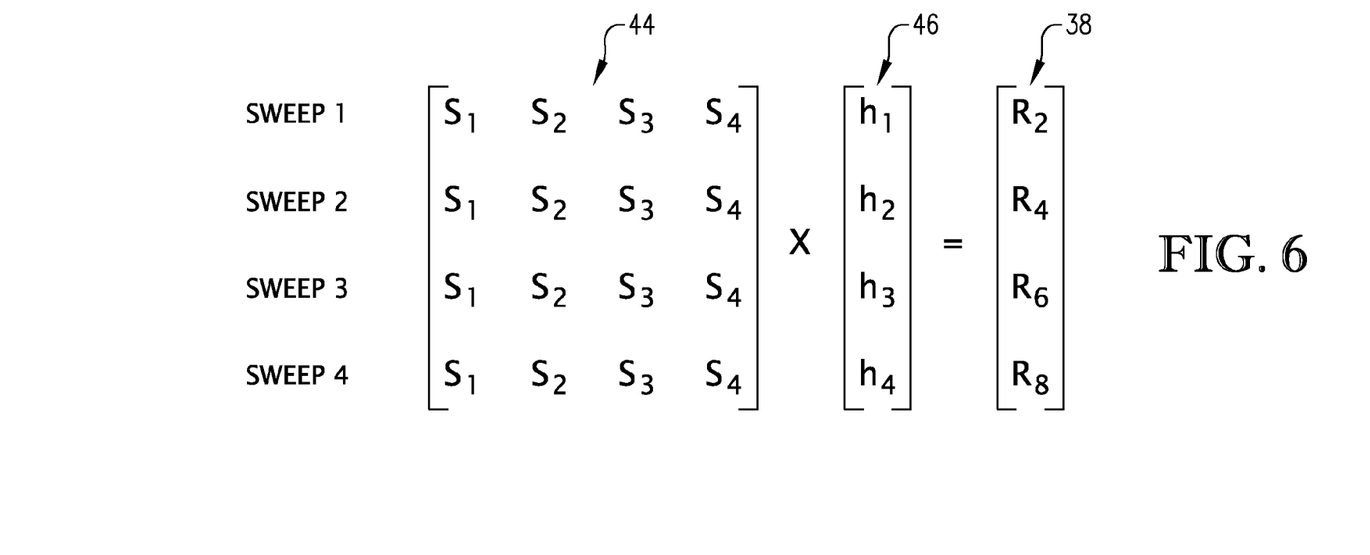
FIG. 6: Equation seeded with prior seismic data. Seeding the equation with common centerpoint data from prior surveys facilitates identification and binning of subsequent reflectivity values.

Turning back to FIG. 2, in step 30, the reorganized seismic data is subjected to source separation. The source separation technique employed for this step can be selected from a variety of conventional source separation techniques that are suitable for use in performing source separation of land-based multiple source vibrator data. FIGS. 5 and 6 depict matrix equations employed in one source separation technique that is suitable for use with the present invention. In the matrix equations of FIGS. 5 and 6, "Sx" represents source data from seismic source x, "Ry" represents receiver data from seismic receiver y, and "hz" represents a reflectivity value z. The 4×4 matrix of source data and the 1×4 array of reflectivity values are the same for the equations of FIGS. 5 and 6, while the 1×4 array of receiver data is different for the equations of FIGS. 5 and 6. In particular, the receiver data used in the equation of FIG. 5 is the receiver data from the first data group 36 illustrated in FIG. 4, while the receiver data used in the equation of FIG. 6 is the receiver data for the second data group 38 illustrated in FIG. 4. Thus, the source separation technique depicted in FIGS. 5 and 6 uses the receiver data that has been reorganized according the technique illustrate in FIG. 4. As set forth in step 32 of FIG. 2, further conventional seismic processing can be performed on the source-separated data resulting from step 30. Such further seismic data processing can include, for example, filtering, stacking, migration, and the like. The source separated and processed data can then be displayed in a human readable format for interpretation in accordance with conventional techniques.

Although the systems and processes described herein have been described in detail, it should be understood that various changes, substitutions, and alterations can be made without departing from the spirit and scope of the invention as defined by the following claims.

REFERENCES

All of the references cited herein are expressly incorporated by reference. Incorporated references are listed again here for convenience:

1. U.S. Ser. No. 11/855,776 filed Sep. 14, 2007, Olson, et al., "Method and Apparatus for Pre-Inversion Noise Attenuation of Seismic Data."
2. U.S. Ser. No. 11/933,522 filed Nov. 1, 2007, Chiu, et al., "Method and Apparatus for Minimizing Interference Between Seismic Systems."
3. U.S. Ser. No. 12/167,683 filed Jul. 3, 2008, Brewer, et al., "Marine Seismic Acquisition with Controlled Streamer Flaring."
4. U.S. Ser. No. 61/109,279 filed Oct. 29, 2008, Eick, et al., "Variable Timing ZENSEIS™."
5. U.S. Ser. No. 61/109,329 filed Oct. 29, 2008, Chiu, et al., "Simultaneous Multiple Source Extended Inversion."
6. U.S. Ser. No. 61/109,403 filed Oct. 29, 2008, Eick, et al., "Marine Seismic Acquisition."
7. U.S. Ser. No. 61/112,810 filed Nov. 10, 2008, Brewer, et al., "4D Seismic Signal Analysis."
8. U.S. Ser. No. 61/112,875 filed Nov. 10, 2008, Eick and Brewer, "Practical Autonomous Seismic Recorder Implementation and Use."
9. U.S. Ser. No. 61/121,976 filed Dec. 12, 2008, Cramer et al., "Controlled Source Fracture Monitoring."
10. U.S. Pat. No. 4,686,654 (Savit), "Method for generating orthogonal sweep signals" (August 1987).
11. U.S. Pat. No. 5,050,129 (Schultz), "Marine seismic data conditioning" (September 1991).
12. U.S. Pat. No. 5,166,905 (Currie), "Means and method for dynamically locating positions on a marine seismic streamer cable" (November 1992).
13. U.S. Pat. No. 5,719,821 (Sallas, Corrigan, Allen), "Method and apparatus for source separation of seismic vibratory signals" (February 1998)
14. U.S. Pat. No. 5,721,710 (Sallas, Corrigan, Allen), "High fidelity vibratory source seismic method with source separation" (February 1998).
15. U.S. Pat. No. 6,847,896 (Orban and Hatteland), "Method and apparatus for seismic data acquisition" (August 2001)
16. U.S. Pat. No. 7,050,356 (Jeffryes), "Method of seismic surveying" (March 2006).
17. U.S. 2004136266 (Howlid, et al.) "Marine seismic surveying" (March 2004).
18. U.S. 2006164916 (Krohn and Johnson), "Method for continuous sweeping and separation of multiple seismic vibrators" (July 2006).

19. U.S. 2008011540 (Moldoveanu), "Enhancing the acquisition and processing of low frequencies for sub-salt imaging" (January 2008).
20. Bordley, "Linear predictive coding of marine seismic data" IEEE Transactions on Acoustics, Speech and Signal Processing, 31:828-835.
21. Chiu, et al. "High Fidelity Vibratory Seismic (HFVS): Optimal Phase Encoding Selection" SEG/Houston 2005 Annual Meeting ACQ 2.2

We claim:

1. A method of acquiring and processing marine seismic data, said method comprising:
    a) moving multiple seismic receivers through a body of water;
    b) simultaneously with step (a), performing a series of periodic seismic sweeps including an initial seismic sweep and a subsequent seismic sweep by simultaneously energizing at least two seismic sources and acquiring source seismic data and reflected seismic data using multiple receivers, wherein the acquiring from the initial seismic sweep is collected by a first set of receivers while the acquiring from the subsequent seismic sweep is collected by a second set of receivers, wherein the first set is different from the second set;
    c) reorganizing said source seismic data and/or said reflected seismic data based on common source-receiver centerpoints from different seismic sweeps, thereby generating reorganized seismic data; and
    d) source separating said reorganized seismic data.

2. The method of claim 1, wherein each seismic sweep includes exciting said at least two of said seismic sources for a period of 1 to 5 seconds.

3. The method of claim 1, wherein the average time interval between said seismic sweeps is 2 to 30 seconds.

4. The method of claim 1, wherein the vibratory energy emitted by said seismic sources during each sweep is encoded for source separation.

5. The method of claim 1, wherein the vibratory energy emitted by said seismic sources during each sweep is phase encoded.

6. The method of claim 1, wherein at least one seismic source emits vibratory energy from 1-150 Hz, 6-120 Hz, 1-60 Hz, 50-150 Hz, 1-80 Hz, 80-160 Hz and combinations thereof.

7. The method of claim 1, wherein the power output of each of said seismic sources during each sweep is 1-500, 15-250, or 20-100 bar·meters·sec.

8. The method of claim 1, wherein the cumulative power output of all said seismic sources during each seismic sweep is less than 100, 25, or 10 bar·meters·sec.

9. The method of claim 1, wherein said reorganizing of step (c) includes grouping reflected seismic data from different sweeps and different receivers based on the common source-receiver centerpoints.

10. The method of claim 9, further comprising acquiring source data during each of said seismic sweeps, wherein said source separating of step (d) includes performing a matrix inversion using said source data and said reorganized reflected seismic data.

11. The method of claim 9, further comprising acquiring encoded source data during each of said seismic sweeps, wherein said seismic reflectivity values are determined by solving the equation $$\begin{bmatrix} S_{11} S_{12} & \ldots & S_{1N} \\ S_{21} S_{22} & \ldots & S_{2N} \\ & \ldots & \\ S_{M1} S_{M2} & \ldots & S_{MN} \end{bmatrix} \begin{bmatrix} h_1 \\ h_2 \\ \ldots \\ h_N \end{bmatrix} = \begin{bmatrix} R_1 \\ R_2 \\ \ldots \\ R_M \end{bmatrix}.$$

wherein each S represents encoded source data for a particular sweep and a particular seismic source, wherein each R represents reorganized reflected data for a particular sweep, wherein M represents the number of sweeps being processed, wherein N represents the number of seismic sources being processed, wherein h represents said seismic reflectivity values.

12. A method of processing seismic data, said method comprising:
    a) receiving seismic data including—
        i) encoded source data for multiple sweeps of multiple seismic sources, wherein the multiple sweeps includes an initial sweep and a subsequent sweep, wherein said multiple sweeps include simultaneous excitation of said multiple seismic sources with said multiple seismic sources being at a substantially different location for each sweep,
        ii) reflected seismic data acquired by multiple seismic receivers for each of said multiple sweeps, wherein a first set of receivers acquires the initial sweep and a second set of receivers acquires the subsequent sweep, wherein the first set and second set are different;
    b) reorganizing said reflected seismic data based on common source-receiver centerpoints from different sweeps, thereby generating reorganized reflected seismic data; and
    c) source separating said reorganized reflected seismic data.

13. The method of claim 12, wherein each seismic sweep includes exciting said at least two of said seismic sources for a period of 1 to 5 seconds.

14. The method of claim 12, wherein the average time interval between said seismic sweeps is 2 to 30 seconds.

15. The method of claim 12, wherein said seismic sources are capable of emitting vibratory energy of controlled phase, frequency, and/or amplitude.

16. The method of claim 12, wherein the vibratory energy emitted by said seismic sources during each sweep is encoded for source separation.

17. The method of claim 12, wherein the vibratory energy emitted by said seismic sources during each sweep is phase encoded.

18. The method of claim 12, wherein at least one seismic source emits vibratory energy from 1-150 Hz, 6-120 Hz, 1-60 Hz, 50-150 Hz, 1-80 Hz, 80-160 Hz and combinations thereof.

19. The method of claim 12, wherein the power output of each of said seismic sources during each sweep is 1-500, 15-250, or 20-100 bar·meters·sec.

20. The method of claim 12, wherein the cumulative power output of all said seismic sources during each seismic sweep is less than 100, 25, or 10 bar·meters·sec.

21. The method of claim 12, wherein said reorganizing of step (c) includes grouping reflected seismic data from different sweeps and different receivers based on the common source-receiver centerpoints.

22. The method of claim 12, further comprising acquiring source data during each of said seismic sweeps, wherein said source separating of step (d) includes performing a matrix inversion using said source data and said reorganized reflected seismic data.

23. The method of claim 12, further comprising acquiring encoded source data during each of said seismic sweeps, wherein said seismic reflectivity values are determined by solving the equation $$\begin{bmatrix} S_{11} S_{12} \ldots S_{1N} \\ S_{21} S_{22} \ldots S_{2N} \\ \ldots \\ S_{M1} S_{M2} \ldots S_{MN} \end{bmatrix} \begin{bmatrix} h_1 \\ h_2 \\ \ldots \\ h_N \end{bmatrix} = \begin{bmatrix} R_1 \\ R_2 \\ \ldots \\ R_M \end{bmatrix}.$$

wherein each S represents encoded source data for a particular sweep and a particular seismic source, wherein each R represents reorganized reflected data for a particular sweep, wherein M represents the number of sweeps being processed, wherein N represents the number of seismic sources being processed, wherein h represents said seismic reflectivity values.

* * * * *